3,642,855
SILYL-CONTAINING DITHIOCARBAMATES WITH FUNCTIONAL GROUPS ON SULFURALKYL ESTER SIDE CHAIN
Abe Berger, Schenectady, N.Y., assignor to General Electric Company
No Drawing. Filed Jan. 3, 1969, Ser. No. 788,960
Int. Cl. C07f 7/04, 7/18
U.S. Cl. 260—448.8 R                                   7 Claims

ABSTRACT OF THE DISCLOSURE

New compositions of matter are prepared by forming functional substituents on the sulfur-alkyl ester side chain of a dithiocarbamate substituent formed on an organosilicon compound. The new compositions are prepared by reacting an organosilicon compound, substituted with an alkyl amine, with carbon disulfide in the presence of a tertiary amine and reacting the reaction product with a compound having a meta-directing group attached to a carbon atom having an olefinic double bond.

BACKGROUND OF THE INVENTION

Related art

This application is related to the copending application of Abe Berger, Ser. No. 796,647, filed of even date herewith.

Prior art

The preparation of dithiocarbamyl-containing organosilicon compounds have been disclosed as, for example, in U.S. Pat. No. 2,938,046—Morehouse. The dithiocarbamyl-containing materials are prepared by reacting an aminoalkyl containing silicon compound with carbon disulfide in the presence of a base. The resulting dithiocarbamates, according to that patent, can be treated with metal salts to produce the corresponding metal dithiocarbamate. However, no provision is made for reacting the compound so as to produce a dithiocarbamate substituted organosilicon compound having a further functional and reactive group connected to the side chain of the dithiocarbamate group.

SUMMARY OF THE INVENTION

In accordance with the present invention, the starting point for the preparation of the dithiocarbamates containing functional groups on the side chain of the dithiocarbamate group is the reaction product resulting from reacting an aminoalkyl substituted organosilicon compound with carbon disulfide in the presence of a tertiary amine base. This reaction mixture is not purified, but is treated, at room temperature, with a compound having a meta-directing group directly connected to a carbon atom having an olefinic double bond. The initial reaction product has a negative sulfur group bonded to the amine residue, and the addition of the meta-directing compound causes a cleavage of the amine residue and an addition of the negative sulfur across the olefinic double bond. Thus, a new class of dithiocarbamate compounds is produced having a functional group attached to the side chain of the dithiocarbamate group, through an ethylene bridge.

The process of the present invention is especially valuable as, while isocyanatoalkyl-substituted organosilicon compounds can be formed by the addition of a silicon hydride group across the double bond of an olefinic unsaturation, where the olefinically unsaturated material has an isocyanate group, similar reactions are not possible. With isothiocyanate and dithiocarbamate groups, apparently, the sulfur constituents poison the platinum catalyst and prevent reaction.

DESCRIPTION OF THE PREFERRED EMBODIMENTS

The method for forming the intermediate for production of the desired product is best illustrated in the generic equation:

(1) 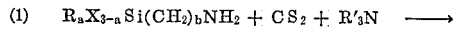

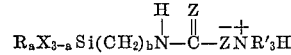

where R and R' are each selected from the class consisting of alkyl groups, aryl groups, and aralkyl groups; X is a lower alkoxy group; $a$ is from 0 to 2; and $b$ is at least 3 and not more than 18.

Among the groups represented by R and R' are alkyl groups, such as, methyl, ethyl, propyl, butyl, octyl, dodecyl, isopropyl, isobutyl, etc.; cycloalkyl radicals, such as, cyclohexyl, cyclopentyl, cycloheptyl, etc.; aryl radicals, such as, phenyl, biphenyl, naphthyl, benzoylphenyl, paraphenoxyphenyl, tolyl, xylyl, etc.; aralkyl radicals, such as, benzyl, phenethyl, etc. Preferably, both R and R' are such substituents of less than 15 carbon atoms.

Among the radicals represented by X are such alkoxy groups such as methoxy, ethoxy, propoxy, isopropoxy, etc. Preferably, the alkoxy group is one in which the alkyl member has from 1 to 3 carbon atoms. In the above formula, $b$ is preferably 3 or 4.

The tertiary amine base is necessary in order to prevent side reactions in the reaction of the aminoalkyl substituted organosilicon compound and carbon disulfide. The reaction according to Equation 1 is preferably conducted in a solvent in which the aminoalkyl substituted organosilicon compound is soluble and which is not reactive with the carbon disulfide or the aminoalkyl substituent. Further, because of the subsequent reaction with the compound having the meta-directing group attached to an olefinically unsaturated group, the reaction is preferably conducted in a hydrocarbon solvent, including aromatic hydrocarbons, such as, benzene, toluene, etc., and aliphatic hydrocarbon solvents, such as, petroleum ether, hexane, heptane, etc. Preferably, the amount of solvent is equal in volume to the other reactants employed, though this is not critical.

Similarly, the amounts of the aminoalkyl substituted organosilicon compound, carbon disulfide, and tertiary amine are in a 1:1:1 stoichiometric ratio, though more or less of either can be employed as, for example, a 10% variation from the stoichiometrically required amounts.

The temperature of reaction is preferably below the boiling point of the carbon disulfide and can conveniently be conducted at temperatures of from 0 to 40° C. In order to minimize side reactions, the carbon disulfide is added to the organosilicon compound.

The reaction between the product of Equation 1 and the compound having the meta-directing group adjacent an olefinically unsaturated carbon atom is also preferably conducted in a hydrocarbon solvent, such as the solvents referenced with respect to the preceding reaction. The concentration of the reactants in the solvent is preferably about 25%, by weight, and the two reactants are employed, preferably, in a stoichiometric ratio of 1:1, though a 10% excess of either, based upon the stoichiometric, can be employed. While the reaction can be carried out in a hydrocarbon solvent as just indicated, the presence of such a solvent is not necessary to carrying out the reaction.

The reaction is carried out, with stirring, at room temperature. Heating is not desirable and moderate heating provides no particular advantage to progress of the reaction which requires approximately 8 to 10 hours.

There is no purification of the intermediate products and the final, desired product is purified by distilling the low boiling materials from the reaction mixture.

The following examples are illustrative of the products and process of the present invention. These examples should not be considered as limiting in any way the full scope of the invention as covered in the appended claims. All parts in these examples are by weight.

Example 1.—A quantity of 22.1 parts gamma-aminopropyltriethoxysilane and a quantity of 1.6 parts of carbon disulfide were placed into a reaction vessel in the absence of a solvent. A quantity of 10.1 parts triethylamine was added to the reaction vessel, dropwise, at room temperature, with stirring. After completion of the addition, the reaction mixture was maintained at room temperature, while stirring was continued, for a period of 1 hour. This resulted in preparation of an intermediate product having the structure:

(2) 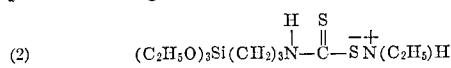

Example 2.—The reaction mixture of Example 1 was employed in the final preparation step without purification. A quantity of 5.4 parts of acrylonitrile was added, with stirring, to the reaction mixture of Example 1. The mixture was stirred overnight at room temperature and the low boiling components of the mixture were then removed at reduced pressure. An infrared scan of the remaining product was consistent with the structure:

(3) 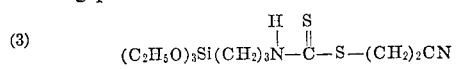

Thus, the resulting product had, not only, the dithiocarbamyl group, but, additionally, a nitrile group, also capable of reaction. Further, the compound of Formula 3 can be reacted in the normal manner of reacting organosilicon compounds because of the presence of the three ethoxy radicals on the silicon compound.

Example 3.—Employing delta-aminobutyl dimethylmethoxysilane and carbon disulfide, in the same manner as in Example 1, an intermediate of formula:

(4) 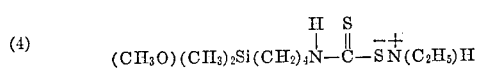

is produced. A quantity of 7 parts of acrylamide is added and processing conducted in the same manner as described in Example 2. A product having the formula:

(5) 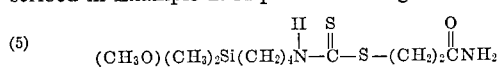

results. Again, the product has not only the dithiocarbamyl group, but an additional reactive group, beside the methoxy substituent on the silicon atom.

Among the compounds having meta-directing groups adjacent an olefinic unsaturation, which can be employed according to the present invention, in addition to acrylonitrile and acrylamide, are nitroethylene, vinyl pyridine, and the vinyl sulfonamides. These can be employed in the process of the present invention with equal facility.

The products of the present invention are useful in the preparation of petroleum oil-resistant polymers, due to the highly polar nature of the substituent on the organosilicon compound, when these monomeric compounds are formed into organopolysiloxanes, through methods well known in the art. Additionally, because of the nature of the functional groups on the dithiocarbamyl, the materials have a high affinity for metal ions and are thus useful as metal complexing agents.

I claim:
1. An organosilicon compound having a dithiocarbamylalkyl substituent of the formula,

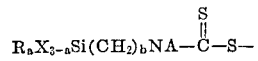

and attached to the dithiocarbamyl group through an ethylene bridge, a meta-directing functional substituent where R is selected from the class consisting of alkyl groups, aryl groups and aralkyl groups of less than 15 carbon atoms; X is a lower alkoxy group, $a$ is from 0 to 2 and $b$ is at least 3 and not more than 18.

2. The organosilicon compound of claim 1 having the formula,

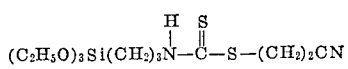

3. The product of claim 1 wherein the functional substituent is nitrile.

4. The product of claim 1 wherein the functional substituent is amide.

5. A process for producing an organosilicon compound having a dithiocarbamylalkyl substituent and, attached to the dithiocarbamyl group, through an ethylene bridge, a further functional group, comprising reacting an aminoalkyl organosilicon compound of formula:

$$R_aX_{3-a}Si(CH_2)_bNH_2$$

with carbon disulfide in the presence of a tertiary amine and reacting the reaction product with a compound having a meta-directing group adjacent an olefinic unsaturation, where R and R' are selected from the class consisting of alkyl, aryl and aralkyl groups of less than 15 carbon atoms; X is a lower alkoxy group; $a$ is from 0 to 2; and $b$ is at least 3.

6. The method of claim 5 wherein the tertiary amine is triethyl amine.

7. The method of claim 5 for forming:

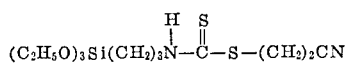

comprising reacting gamma-aminopropyltriethoxysilane and carbon disulfide in the presence of triethylamine and reacting this reaction product with acrylonitrile.

References Cited

UNITED STATES PATENTS 2,762,826   9/1956   Noll _____ 260—448.2
2,938,046   5/1960   Morehouse _____ 260—448.2

TOBIAS E. LEVOW, Primary Examiner

P. L. SHAVER, Assistant Examiner

U.S. Cl. X.R.

260—46.5 E